United States Patent
Venkataraman et al.

(10) Patent No.: US 10,194,269 B2
(45) Date of Patent: Jan. 29, 2019

(54) SYSTEMS AND METHODS FOR USING DOPPLER MEASUREMENTS TO ESTIMATE A POSITION OF A RECEIVER

(71) Applicant: NextNav, LLC, Sunnyvale, CA (US)

(72) Inventors: Jagadish Venkataraman, San Jose, CA (US); Chen Meng, Beijing (CN)

(73) Assignee: NextNav, LLC, Sunnyvale, CA (US)

( * ) Notice: Subject to any disclaimer, the term of this patent is extended or adjusted under 35 U.S.C. 154(b) by 20 days.

(21) Appl. No.: 15/288,498

(22) Filed: Oct. 7, 2016

(65) Prior Publication Data
US 2017/0026797 A1 Jan. 26, 2017

Related U.S. Application Data

(60) Provisional application No. 62/240,205, filed on Oct. 12, 2015.

(51) Int. Cl.
*H04W 4/02* (2018.01)
*G01S 19/48* (2010.01)

(52) U.S. Cl.
CPC .............. *H04W 4/023* (2013.01); *G01S 19/48* (2013.01)

(58) Field of Classification Search
CPC ... H04B 7/1855; H04B 7/18513; G01S 19/05; G01S 19/29; G01S 19/33; G01S 19/38; G01S 19/52; G01S 19/06; G01S 19/22; G01S 19/254; G01S 19/42; G01S 5/0036; B64G 1/242; H04W 64/00; H04W 64/006
See application file for complete search history.

(56) References Cited

U.S. PATENT DOCUMENTS

| | | | | |
|---|---|---|---|---|
| 3,702,477 A | * | 11/1972 | Brown | G01C 21/165 342/451 |
| 6,275,705 B1 | * | 8/2001 | Drane | G01S 1/024 342/357.31 |
| 8,200,238 B2 | * | 6/2012 | Gildea | G01S 19/52 455/456.1 |
| 2014/0274109 A1 | * | 9/2014 | Venkatraman | G01S 5/0252 455/456.1 |

* cited by examiner

*Primary Examiner* — Gary Lafontant
(74) *Attorney, Agent, or Firm* — Kyle Pendergrass

(57) ABSTRACT

Estimating the position of a receiver using positioning signals and Doppler frequency measurements. Approaches for estimating the position of a receiver using positioning signals and Doppler frequency shift measurements determine an initial estimate of a receiver's position using ranging signals from a first system, generate Doppler frequency shift measurements using the Doppler positioning signals from a second system, and refine the initial estimate using the Doppler frequency shift measurements.

32 Claims, 12 Drawing Sheets

SYSTEMS AND METHODS FOR USING DOPPLER MEASUREMENTS TO ESTIMATE A POSITION OF A RECEIVER

TECHNICAL FIELD

This disclosure relates to estimating the position of a receiver using positioning signals and Doppler frequency shift measurements.

BACKGROUND

Determining the exact location of a receiver (e.g. a mobile phone) in an environment can be quite challenging, especially when the receiver is located in an urban environment, or is located within a building. Imprecise estimates of the receiver's position may have "life or death" consequences for the user. For example, an imprecise estimate of a receiver's position, such as the position of a mobile phone operated by a user calling 911, can delay emergency personnel response times.

Positioning systems used to estimate the position of the receiver, like the Global Positioning System (GPS), have been in use for many years. Unfortunately, poor signal conditions found in urban and indoor environments may degrade the performance of these conventional positioning systems. To improve positioning accuracy in urban and indoor environments, GPS may be augmented by positioning systems that use terrestrial transmitters. Even augmented positioning systems can be ineffective at estimating a receiver's position in an urban area or inside a building. Thus, new approaches that accurately determine the location of a receiver, or that refine initial estimates of the receiver's position are needed.

DETAILED DESCRIPTION

Figure 1:
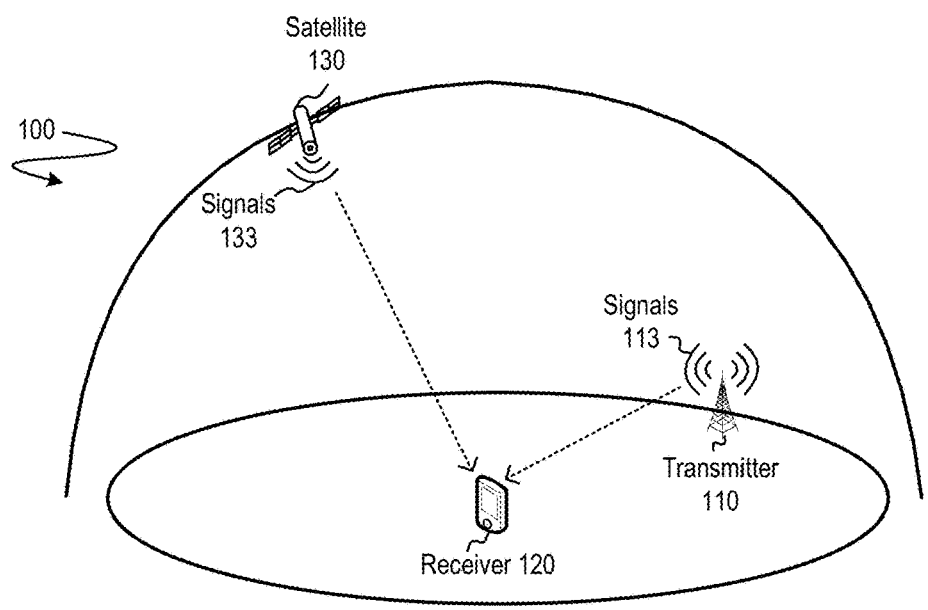
FIG. 1 shows a positioning system for using Doppler frequency measurements of signals from a satellite to refine an initial estimated position of a receiver.

This disclosure describes approaches for estimating the position of a receiver using Doppler frequency measurements. In one approach, Doppler frequency measurements that are generated using signals from orbiting satellite vehicles or non-orbiting aerial vehicles are used to refine (e.g. improve the accuracy of) an initial estimate of a receiver's position. The initial estimated position may be generated in different ways known, including generating the initial estimated position using positioning signals from another system such as a Global Navigation Satellite System (GNSS), a cellular network, a terrestrial positioning system like that described in co-assigned U.S. Pat. No. 8,130,141, issued Mar. 6, 2012, and U.S. Patent Application Publication No. US 2012/0182180, published Jul. 19, 2012, or another network.

As mentioned above, Doppler frequency measurements may be used to refine an initial estimated position of the receiver. "Refining" an initial estimated position should be taken to mean that the refined initial estimated position generated using positioning signals of a first system in conjunction with the Doppler frequency measurements of signals of a second system is better in some way (e.g. more accurate, less noisy, more quickly acquired, more cost effective, etc.) than that of the initial estimated position that was generated without the use of the Doppler frequency measurements.

The initial estimated position may be synchronously or asynchronously generated using the Doppler frequency measurements in conjunction with signals from a terrestrial transmitter and/or a satellite. There is no requirement that the initial estimated position be generated at a first time and then at a later time refined using the Doppler frequency measurements. Thus, the Doppler frequency measurements may be used concurrently with the other positioning signals to generate the refined estimate of a receiver's position.

The positioning signals used for generating Doppler frequency measurements are transmitted from one or more transmitters located at known positions when signals are transmitted. For example, the one or more transmitters could be a network of low-earth-orbit (LEO) satellites, a network of unmanned aerial aircraft, or satellites of a GNSS network such as GPS.

In one embodiment, if GPS is used to determine the initial estimated position of a receiver, Doppler frequency measurements generated using positioning signals from GPS satellites would not be used to refine the initial estimated position. Rather, satellites of a second GNSS network, such as GLONASS, could be used. Alternatively a LEO satellite could be used, or another positioning system other than GPS could be used. This is distinct from systems that use Doppler frequency measurements of GPS signals to refine GPS estimated positions. In more general terms, the network of transmitters used to determine the initial estimated position and the network of transmitters used to determine the Doppler frequency measurements are different.

It is noted that a GPS satellite may have an orbital altitude of approximately 20,000 km with an orbital velocity of up to 14,000 km/hour, whereas a LEO satellite may have an orbital altitude between 160 km and 2,000 km with an orbital velocity of up to 28,080 km/hour. As can be seen, the differences between orbital altitude and orbital velocity are significant. In some embodiments, generating Doppler frequency measurements using positioning signals from a network of LEO satellites is preferred over using positioning signals from satellites of a GNSS network like GPS. One reason is that positioning signals transmitted from the LEO satellites may experience less attenuation than those of GNSS satellites before reaching the receiver. The signals transmitted from the LEO satellites may be able to achieve greater penetration in indoor, urban, and other areas with obstructions, to provide an opportunity for increased accuracy when determining Doppler frequency measurements as compared to using signals from a GNSS satellite.

As is known, one equation for the Doppler frequency of a signal transmitted from a transmitter and received at a receiver is:

$$D_{meas} = (\underline{V_i} - \underline{V_u}) \cdot \frac{(r_i - r_u)}{\|r_i - r_u\|} \cdot \frac{L}{c} + d + \varepsilon, \quad \text{(Equation 1)}$$

where $D_{meas}$ is the measured Doppler frequency, $V_i$ is the velocity of the transmitter, $V_u$ is the velocity of the receiver, $r_i$ is the location of the transmitter, $r_u$ is the location of the receiver, L is the carrier frequency of the transmitted signal, c=299,792,458 m/s is the velocity of light, d is the frequency drift rate of the receiver's clock, and $\varepsilon$ is assumed to be Gaussian measurement noise.

Given Equation 1 above, if the transmitter's location r and velocity $V_i$ are known, and the velocity of the receiver $V_u$ is known, then the measured Doppler frequency $D_{meas}$ can be used to estimate the position of the receiver $r_u$.

Equation 1 can be simplified if a few assumptions are made. For example, it may be assumed that $V_u=0$, d=0, and the measurement noise $\varepsilon$ has a Gaussian distribution with a known standard deviation, of $\varepsilon=\sigma_\varepsilon$. Of course, the receiver may not be stationary, and its velocity can be determined using various approaches understood in the art. If the above assumptions are made, Equation 1 simplifies to:

$$\hat{D}_{meas} = \underline{V_i} \cdot \frac{(r_i - r_u)}{\|r_i - r_u\|} \cdot \frac{L}{c} + \varepsilon. \quad \text{(Equation 2)}$$

Next, it is assumed that the receiver's position has been hypothesized as $\hat{r}_u$. Were the receiver indeed at the position $\hat{r}_u$, the estimated Doppler frequency $\hat{D}$ measured by the receiver at that position would be:

$$\hat{D} = \underline{V_i} \cdot \frac{(r_i - \hat{r}_u)}{\|r_i - \hat{r}_u\|} \cdot \frac{L}{c}. \quad \text{(Equation 3)}$$

As can be seen by comparing Equation 2 and Equation 3, if the measurement noise $\varepsilon$ were eliminated and the hypothetical position $\hat{r}_u$ of the receiver were at the actual position $\hat{r}_u$ of the receiver (e.g. $\hat{r}_u=r_u$), then $\hat{D}_{meas}$ would equal $\hat{D}$. Therefore, given the measured Doppler frequency value $\hat{D}_{meas}$ and an estimated Doppler frequency value $\hat{D}$ for a hypothetical receiver position $\hat{r}_u$, a likelihood function may be generated using a probability density function (PDF) of the form:

$$f(x; \mu, \sigma^2) = \frac{1}{\sqrt{2\pi\sigma^2}} \exp\left[-\frac{(x-\mu)^2}{2\sigma^2}\right]. \quad \text{(Equation 4)}$$

Thus, the likelihood function of the Doppler frequency measurement $\hat{D}_{meas}$, given the estimated position $\hat{r}_u$ of the receiver may be expressed as:

$$p(\hat{D}_{meas} | \hat{r}_u) = \frac{1}{\sqrt{2\pi\sigma_\varepsilon^2}} \exp\left[-\frac{(\hat{D}_{meas} - \hat{D})^2}{2\sigma_\varepsilon^2}\right]. \quad \text{(Equation 5)}$$

As will be described later, the likelihood value, $p(\hat{D}_{meas}|\hat{r}_u)$ may be used to refine estimates of the receiver's position. In some embodiments, the likelihood value identified in Equation 5 is used to refine an error surface. In other embodiments, the likelihood value $p(\hat{D}_{meas}|\hat{r}_u)$ identified in Equation 5 is used to adjust weights associated with each particle of a particle filter, which may be based on "particle" representations of probability densities that can be applied to any state-space model. In yet other embodiments, the likelihood value $p(\hat{D}_{meas}|\hat{r}_u)$ identified in Equation 5 is used to adjust one or more state variables of a Kalman filter acting upon signals of positioning system, or used as an input to an Extended Kalman filter acting upon signals of positioning system.

Further details about each of the above approaches are provided below following a brief description of systems that implement these approaches.

Example Systems

FIG. 1 shows a positioning system 100 with terrestrial transmitters 110, a receiver 120, and satellites 130. As discussed later, Doppler frequency measurements of signals 133 from the satellites 130 are used to refine an initial estimated position of the receiver 120 that was generated using signals 113 from the terrestrial transmitters 110.

As shown in FIG. 1, the transmitters 110 transmit the signals 113, which are received by the receiver 120. In some embodiments, the signals 113 are transmitted using one or more common multiplexing parameters—e.g. time slot, pseudorandom sequence, or frequency offset. Each of the signals 113 from each of the transmitters 110 carries different information that, once extracted by the receiver 120 or a backend server (not shown), may identify the following: (1) the transmitter that transmitted the signal; (2) the latitude, longitude and altitude (LLA) of that transmitter; (3) pressure, temperature, humidity, and other atmospheric conditions at or near that transmitter; (4) ranging information that is used to measure a distance to that transmitter for use during trilateration to compute an initial estimated position of the receiver; and/or (5) other information. In some embodiments, the transmitters 110 could be included in either or both of a terrestrial positioning system or a cellular network.

The satellites 130 transmit the signals 133, which are received by the receiver 120. Each of the signals 133 from each of the satellites 130 carries different information that, once extracted by the receiver 120 or the backend, may identify the following: (1) the satellite that transmitted the signal; (2) the coordinates of that satellite; (3) the velocity of that satellite; (4) the time of transmission; and/or (5) other information. In some embodiments, the satellites 130 are LEO satellites, and in other embodiments, the satellites 130 are GNSS or other types of satellites.

With reference to FIG. 1, an example process for estimating a position of the receiver 120 is detailed below.

First, a velocity estimate $V_u$ of the receiver 120 is generated. The velocity estimate $V_u$ could be generated using an inertial sensor of the receiver; it could be generated using positioning signals; or, it could be generated using another method as would be known.

The signals 133 are received at the receiver 120. The received Doppler frequency, $\hat{D}_{meas}$, of the signals 133 is measured using a method of frequency determination as would be known (e.g. FFT).

The location $r_i$ and the velocity $V_i$ of the satellites 130 are identified (e.g. the location when the signals 133 were transmitted). Additionally, the transmitted carrier frequency L of the signals 133 is identified. This information could be part of a data payload of the signals 133, or it could be provided by another system.

Next, $\hat{D}_{meas}$, $V_u$, a $r_i$ and $V_i$ are used to generate likelihood values $p(\hat{D}_{meas}|\hat{r}_u)$ within a search space. Each hypothesized position $\hat{r}_u$ of the receiver 120 corresponds to a position sampled from within the search space. The search space corresponds to a region that may be centered around an initial estimated position of the receiver 120, which may be determined using various approaches known (e.g. the location of a wireless internet access point or cell tower within proximity to the receiver 120, the last known position of the receiver 120, a coarse estimated position of the receiver 120 using the signals 113, or other approach known).

Finally, likelihood values $p(\hat{D}_{meas}|\hat{r}_u)$ corresponding to hypothesized positions $\hat{r}_u$ within the search space may be used to further refine an initial estimated position of the receiver 120.

The process described above, as well as other techniques for using Doppler frequency measurements of signals to estimate the position of the receiver 120, will be further discussed below with reference to FIG. 10 through FIG. 17. However, FIG. 2 through FIG. 9 are first discussed to illustrate different systems for implementing such techniques for using Doppler frequency measurements of signals to estimate the position of the receiver 120.

Figure 2:
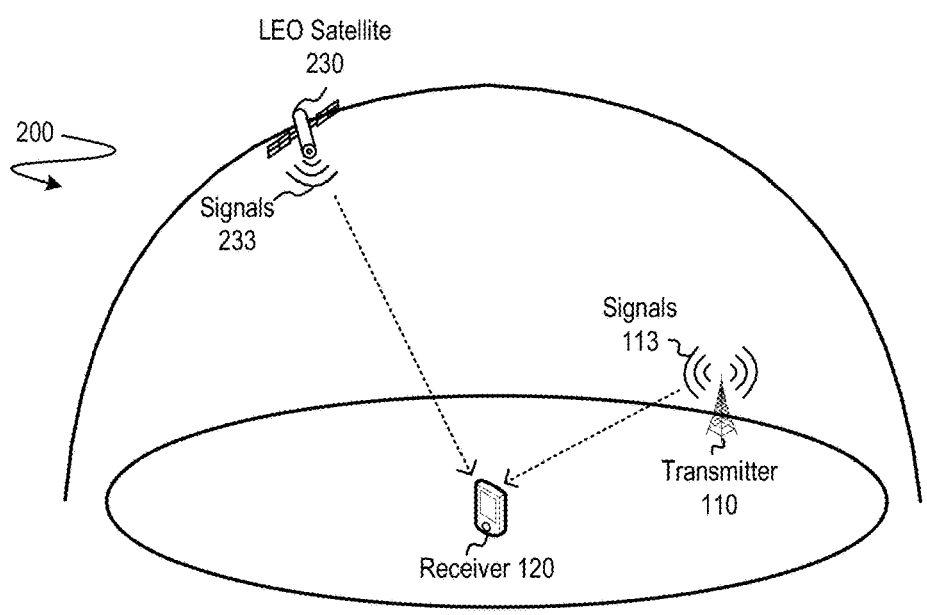
FIG. 2 shows a positioning system for using Doppler frequency measurements of signals from a low earth orbit (LEO) satellite to refine an initial estimated position of a receiver.

FIG. 2 shows a positioning system 200 for using Doppler frequency measurements of signals 233 from low earth orbit (LEO) satellites 230 to refine an initial estimated position of the receiver 120. The initial estimated position of the receiver 120 may be generated using the signals 113. A LEO satellite is considered to be a satellite with an orbital altitude in the range of up to about 2,000 km. However, other contemplated satellites that can substitute for the LEO satellite 230 may have an orbital altitude of up to 15,000 km. In some embodiments, the transmitters 110 could belong to one or both of a terrestrial positioning system and/or a cellular network.

Figure 3:
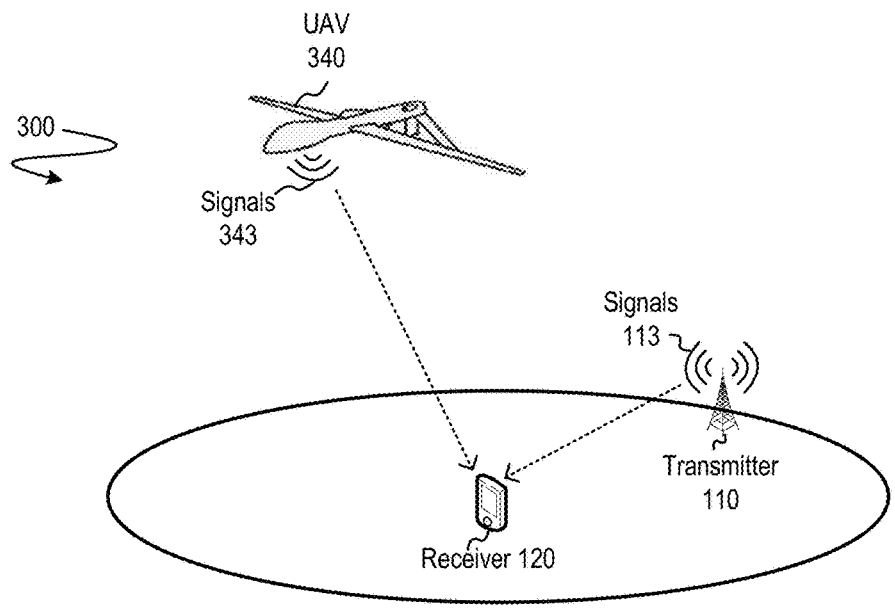
FIG. 3 shows a positioning system for using Doppler frequency measurements of signals from a non-orbiting aerial vehicle to refine an initial estimated position of a receiver.

FIG. 3 shows a positioning system 300 for using Doppler frequency measurements of signals 343 from non-orbiting aerial vehicles ("aerial vehicles") 340 to refine the initial estimated position of the receiver 120. The non-orbiting aerial vehicles 340 may be unmanned aerial vehicles (e.g. "drones"), balloons, or manned aerial vehicles. At the time of transmitting the signals 343, the position and velocity of the aerial vehicles 340 may be determined using instrumentation located in the aerial vehicles 340, ground-based instrumentation, or another method as would be known.

Figure 4:
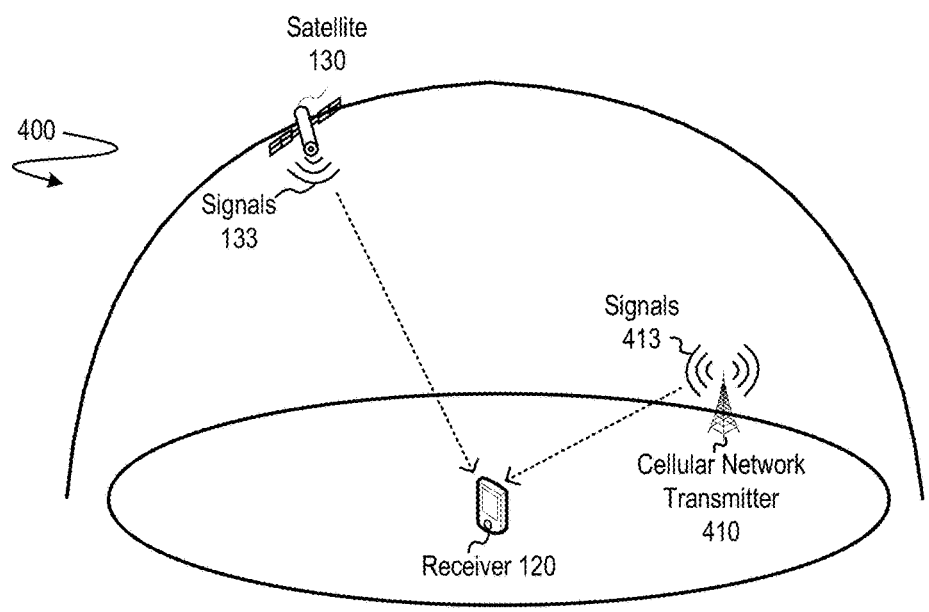
FIG. 4 shows a positioning system for using Doppler frequency measurements of signals from a satellite to refine an initial estimated position of a receiver that was generated using signals from a terrestrial transmitter of a cellular network.

FIG. 4 shows a positioning system 400 for using Doppler frequency measurements of the signals 133 to refine an initial estimated position of the receiver 120 that was generated using signals 413 from a terrestrial transmitter 410 of a cellular network. Estimation of a position of the receiver 120 using the signals 413 may be accomplished using various known techniques, including trilateration.

Figure 5:
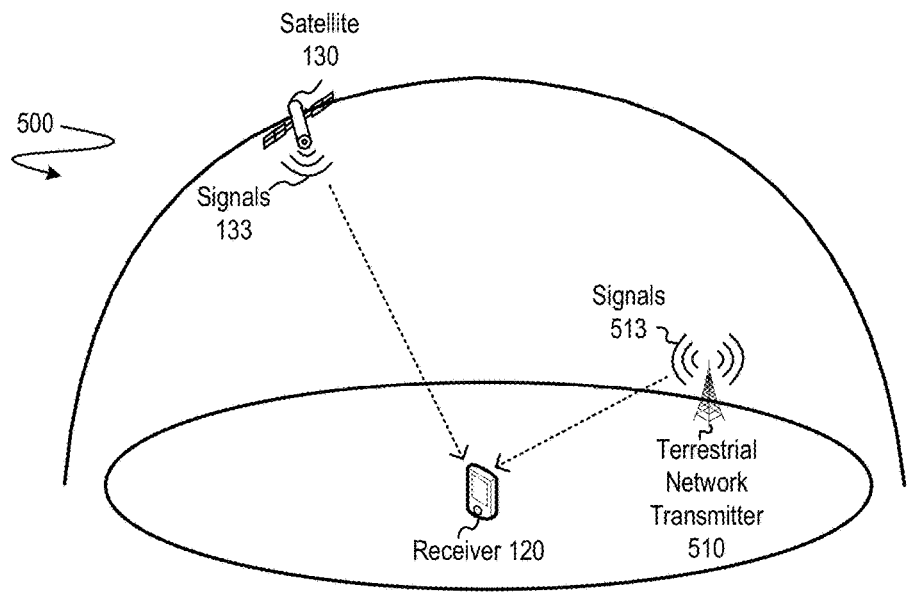
FIG. 5 shows a positioning system for using Doppler frequency measurements of signals from a satellite to refine an initial estimated position of a receiver that was generated using signals from a terrestrial transmitter of a terrestrial positioning system.

FIG. 5 shows a positioning system 500 for using Doppler frequency measurements of the signals 133 to refine an initial estimated position of the receiver 120 that was generated using signals 513 from terrestrial transmitters 510 of a terrestrial positioning system. Initial estimation of the position of the receiver 120 using the signals 513 may use various known techniques, including trilateration.

Figure 6:
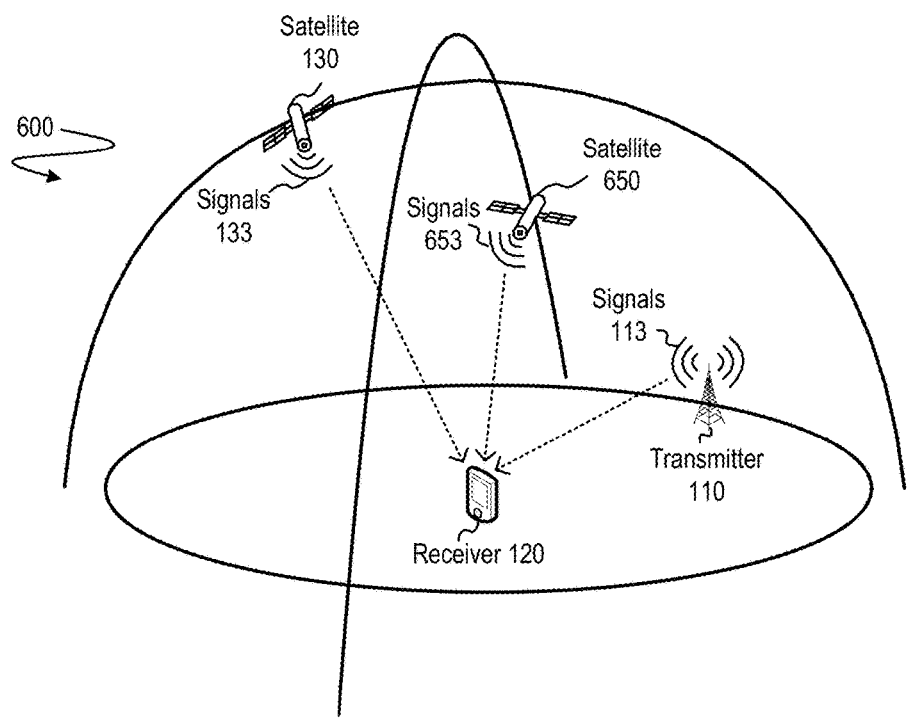
FIG. 6 shows a positioning system for using Doppler frequency measurements of signals from a satellite to refine an initial estimated position of a receiver that was generated using signals from both a terrestrial transmitter and a satellite.

FIG. 6 shows a positioning system 600 for using Doppler frequency measurements of the signals 133 to refine an initial estimated position of the receiver 120 that was generated using the signals 113 and using signals 653 from satellites 650 (e.g. GNSS satellites). Methods for generating an initial estimated position of the receiver 120 using the signals 653 are known.

Figure 7:
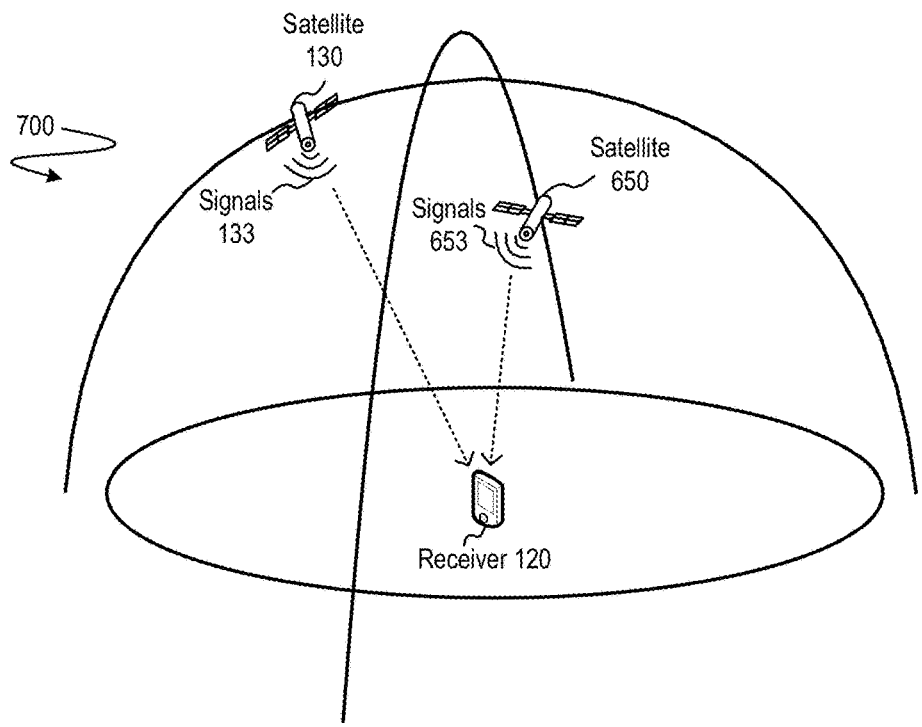
FIG. 7 shows a positioning system for using Doppler frequency measurements of signals from a satellite to refine an initial estimated position of a receiver that was generated using signals from a satellite.

FIG. 7 shows a positioning system 700 for using Doppler frequency measurements of the signals 133 to refine an initial estimated position of the receiver 120 that was generated using the signals 653.

Figure 8:
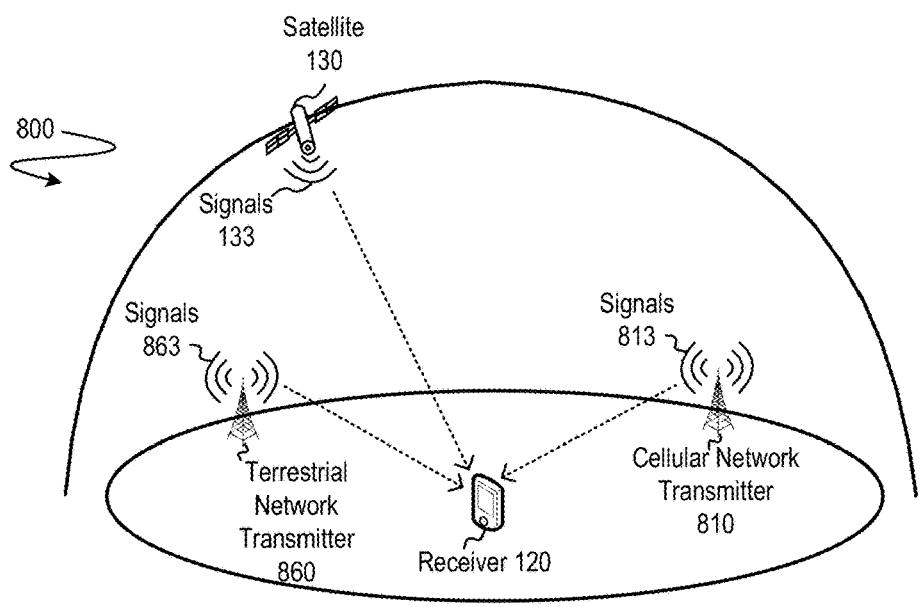
FIG. 8 shows a positioning system for using Doppler frequency measurements of signals from a satellite to refine an initial estimated position of a receiver that was generated using signals from terrestrial transmitters of a terrestrial positioning system and a cellular network.

FIG. 8 shows a positioning system 800 for using Doppler frequency measurements of the signals 133 to refine an initial estimated position of the receiver 120 that was generated using signals 863 from terrestrial transmitters 860 of a terrestrial positioning system and signals 813 from terrestrial transmitters 810 of a cellular network.

Figure 9:
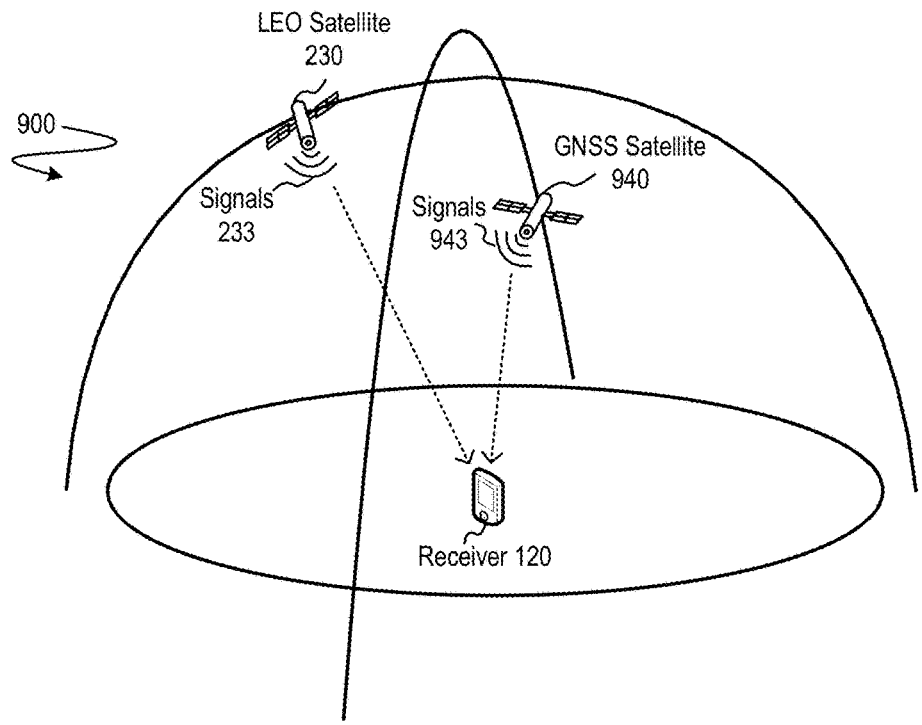
FIG. 9 shows a positioning system for using Doppler frequency measurements of signals from a LEO satellite to refine an initial estimated position of a receiver that was generated using signals a Global Navigation Satellite System (GNSS) satellite.

FIG. 9 shows a positioning system 900 for using Doppler frequency measurements of the signals 233 to refine an initial estimated position of the receiver 120 that was generated using signals 943 from GNSS satellites 940.

Figure 10:
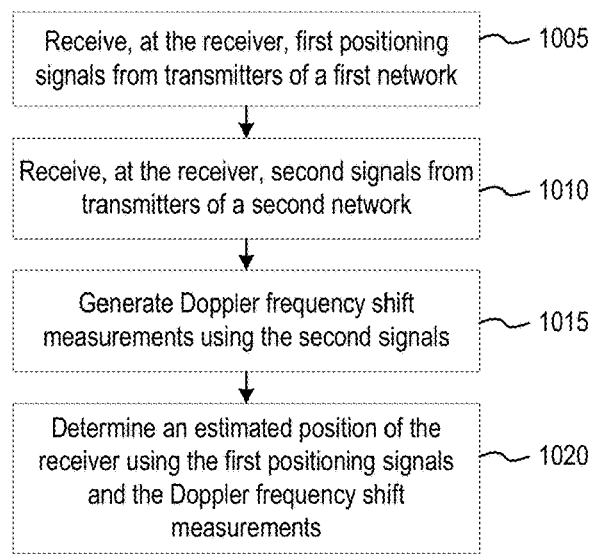
FIG. 10 details a process for estimating the position of a receiver using Doppler frequency measurements.

Techniques for Using Doppler Frequency
Measurements to Estimate a Receiver's Position FIG. 10 details a process for estimating the position of a receiver using Doppler frequency measurements. The process includes the steps of: receiving, at the receiver, first positioning signals from transmitters of a first network (step 1005); receiving, at the receiver, second signals from transmitters of a second network (step 1010); generating Doppler frequency shift measurements using the second signals (step 1015); and determining an estimated position of the receiver using the first positioning signals and the Doppler frequency shift measurements (step 1020).

The transmitters of the first network may include a network of GNSS satellites, a network of non-GNSS satellites, transmitters of a terrestrial positioning system, cellular towers of a wireless cellular network, wireless access points of a wireless network, and/or another network.

The transmitters of the second network may include one or more orbiting satellite vehicles with an orbital height of less than 15,000 km, one or more non-orbiting aerial vehicles, or other types of transmitters, including those described above for the transmitters of the first network.

In one implementation of FIG. 10, the receiver receives the first positioning signals from the transmitters of the first network when the receiver is in a first region, receives third positioning signals from transmitters of a third network when the receiver is in a second region, receives additional signals from the transmitters of the second network, generates additional Doppler frequency shift measurements using the additional signals, and determines another estimated position of the receiver using the third positioning signals and the additional Doppler frequency shift measurements.

In another implementation of FIG. 10, the receiver receives the first positioning signals from the transmitters of the first network during a first time period, receives third positioning signals from transmitters of a third network during a second time period, receives additional signals from the transmitters of the second network, generates additional Doppler frequency shift measurements using the additional signals, and determines another estimated position of the receiver using the third positioning signals and the additional Doppler frequency shift measurements.

Techniques for using one or more operative functions to determine the estimated position of the receiver are described below.

Figure 11:
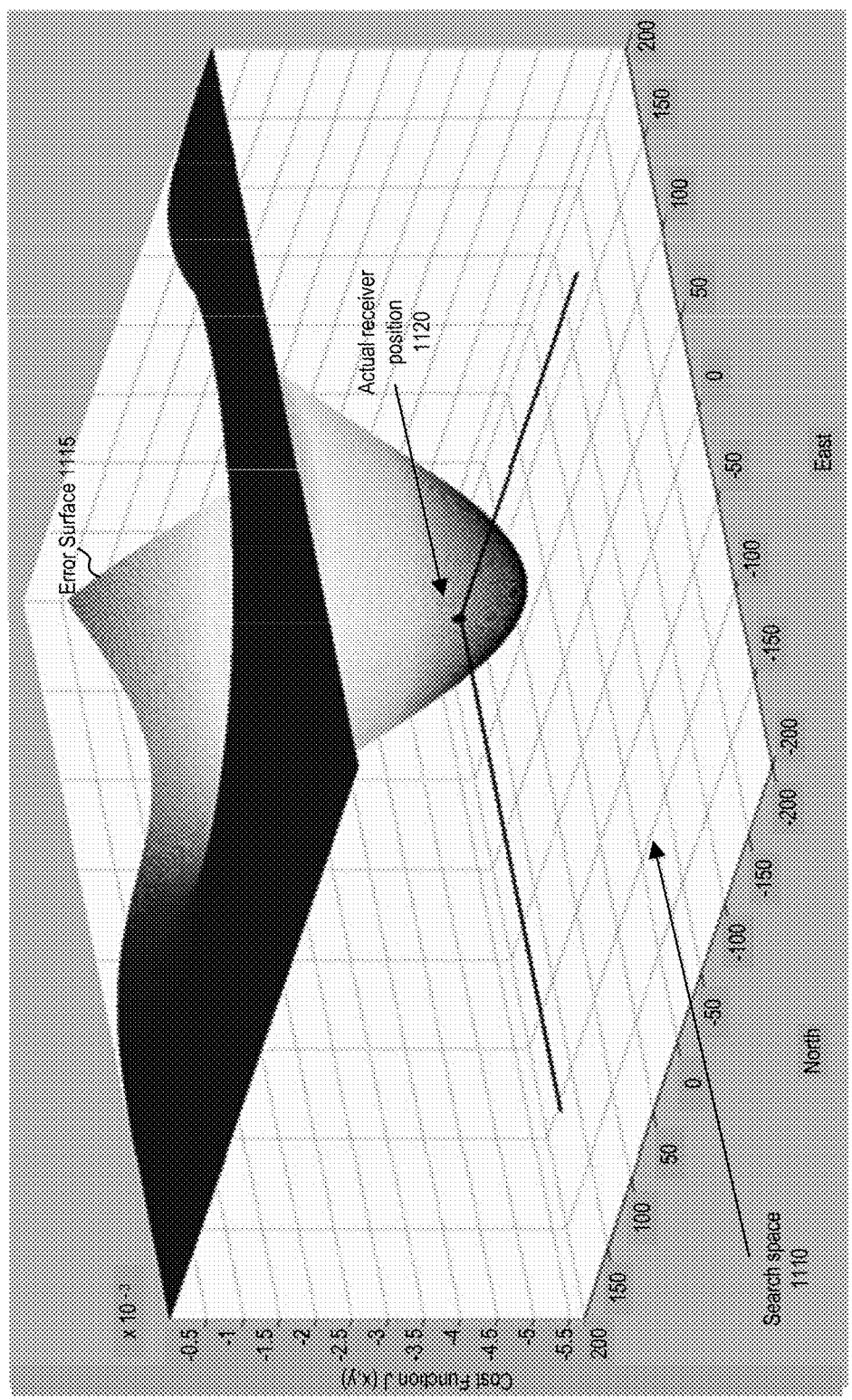
FIG. 11 shows a first error surface of a receiver search space.

FIG. 11 shows a first error surface 1115 of a receiver search space 1110 that is generated using signals of a terrestrial network. The receiver search space 1110 is defined as a region within which a receiver is hypothesized to be located. The search space in this example includes a 400 meter by 400 meter horizontal region. The center point of the region may correspond to a first estimated position of the receiver generated using the signals received from terrestrial transmitters and/or signals received from satellites of a satellite positioning system. For sake of illustration, the receiver is located at the actual receiver position ("true position") 1120.

In some embodiments, the first error surface 1115 is generated using a cost function, J(x,y), in the form of that seen below:

$$J(x, y) = \mathrm{argmin}_{x,y} \sum_{k=1}^{K} w_k |p_k - r_k(x, y, \hat{z}) - \hat{t}_b(x, y, \hat{z})|.$$ (Equation 6)

The cost function, J(x,y), is a function that maps a point representing a hypothetical position of the receiver, sampled from search space 1110, to a value inversely proportional to the likelihood of that position being the receiver's true position 1120. The value of the cost function at that point is generated using the signals received from terrestrial transmitters and/or signals received from satellites of a satellite positioning system. Optimization routines may operate upon error surface 1115 to find a region of minimum value. The region of minimum value corresponds to a horizontal region in the search space 1110 in which the receiver's true position 1120 is most likely to be located. Various techniques may be used to then select a single point to represent the estimated position of the receiver from within the horizontal region.

Figure 12:
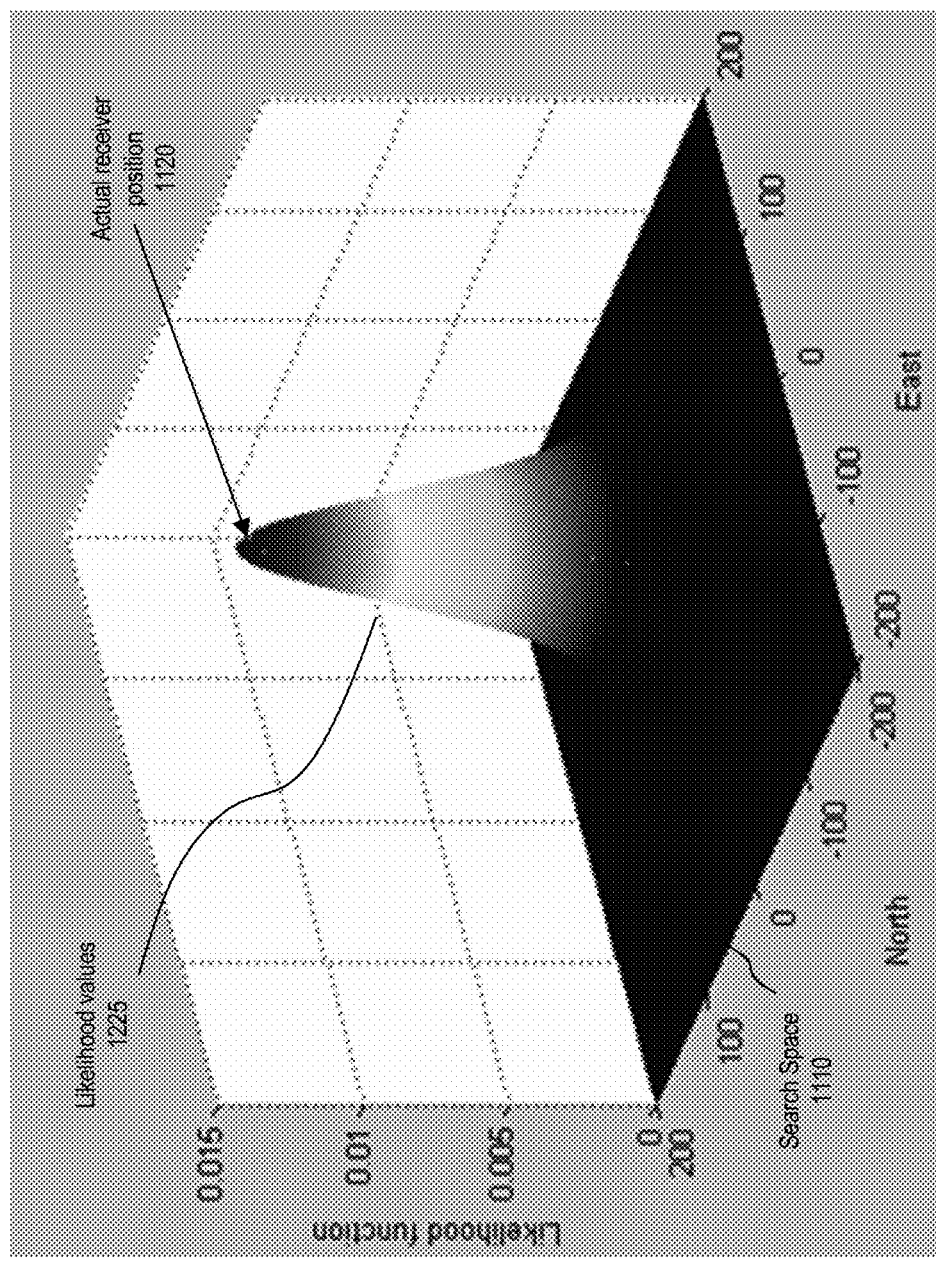
FIG. 12 shows a surface generated with a parameterized probability density function.

FIG. 12 shows a surface 1225 generated using a parameterized probability density function like that of Equation 5. The value of the surface 1225 at each point (i.e. "position") sampled from within the search space 1110 corresponds to the probability of that position being the receiver's actual position 1120 given Doppler frequency measurements of received signals.

Figure 13:
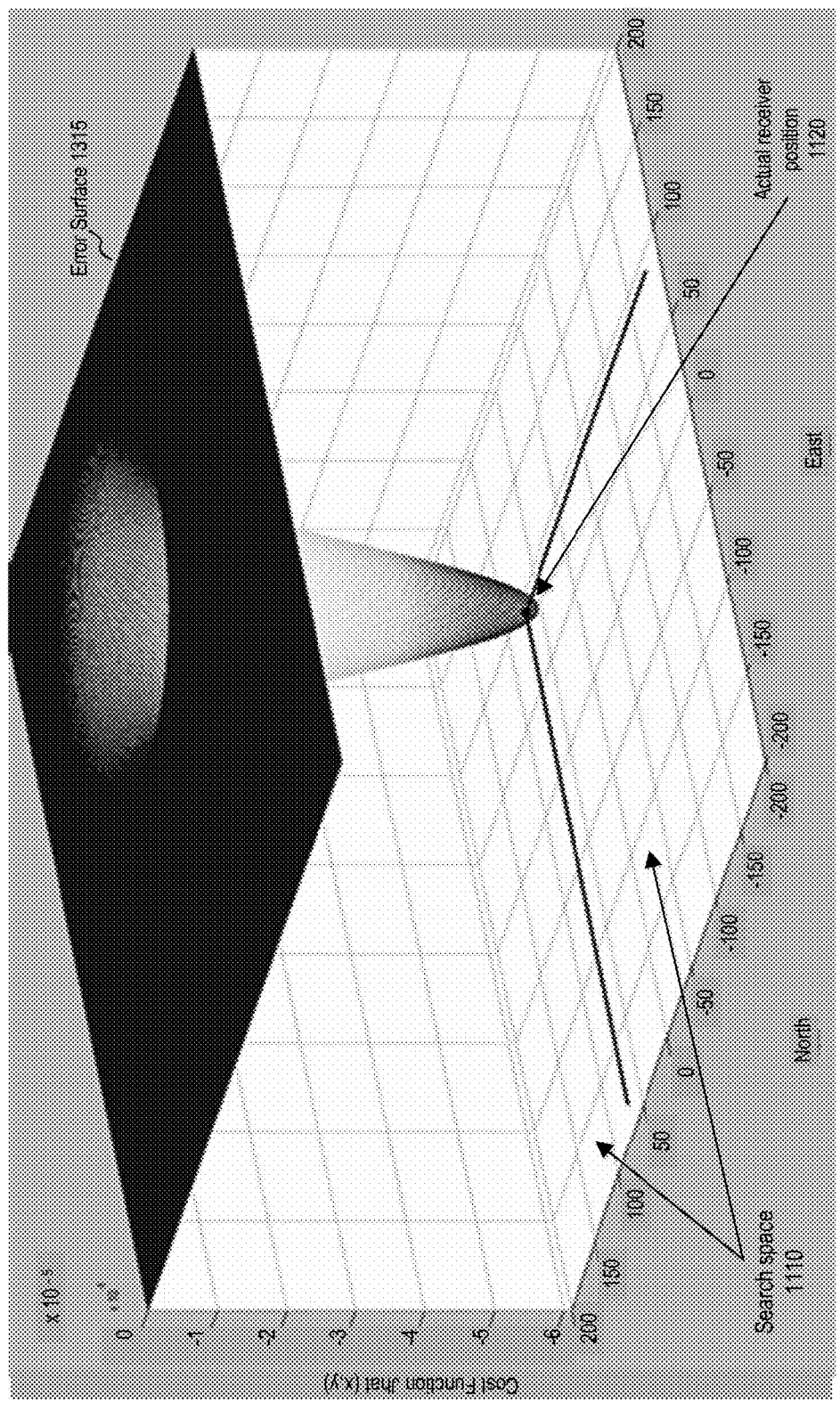
FIG. 13 shows a second error surface of a receiver search space.

FIG. 13 shows a second error surface 1315 that is determined by multiplying the values of points on the first error surface 1115 of FIG. 11 by the values of corresponding points on the surface 1225 of FIG. 12. The value at each point of the first error surface 1115 is scaled using the likelihood values $p(\hat{D}_{meas}|\hat{r}_u)$, where each $\hat{r}_u$ is a point on the first error surface 1115 corresponding to the sampled search space, and $\hat{D}_{meas}$ is the measured Doppler frequency of signals received at the receiver from a Doppler signal.

Scaling of the first error surface 1115 by the values of the surface 1225 generates the second error surface 1315 that is much "peakier" than the first error surface 1115. Thus, an optimization function used to find a region of minimum error on the second error surface 1315 will utilize a smaller horizontal region (e.g. a cross-sectional region of minimum error found on the second error surface 1315) of probable positions for the receiver.

Figure 14:
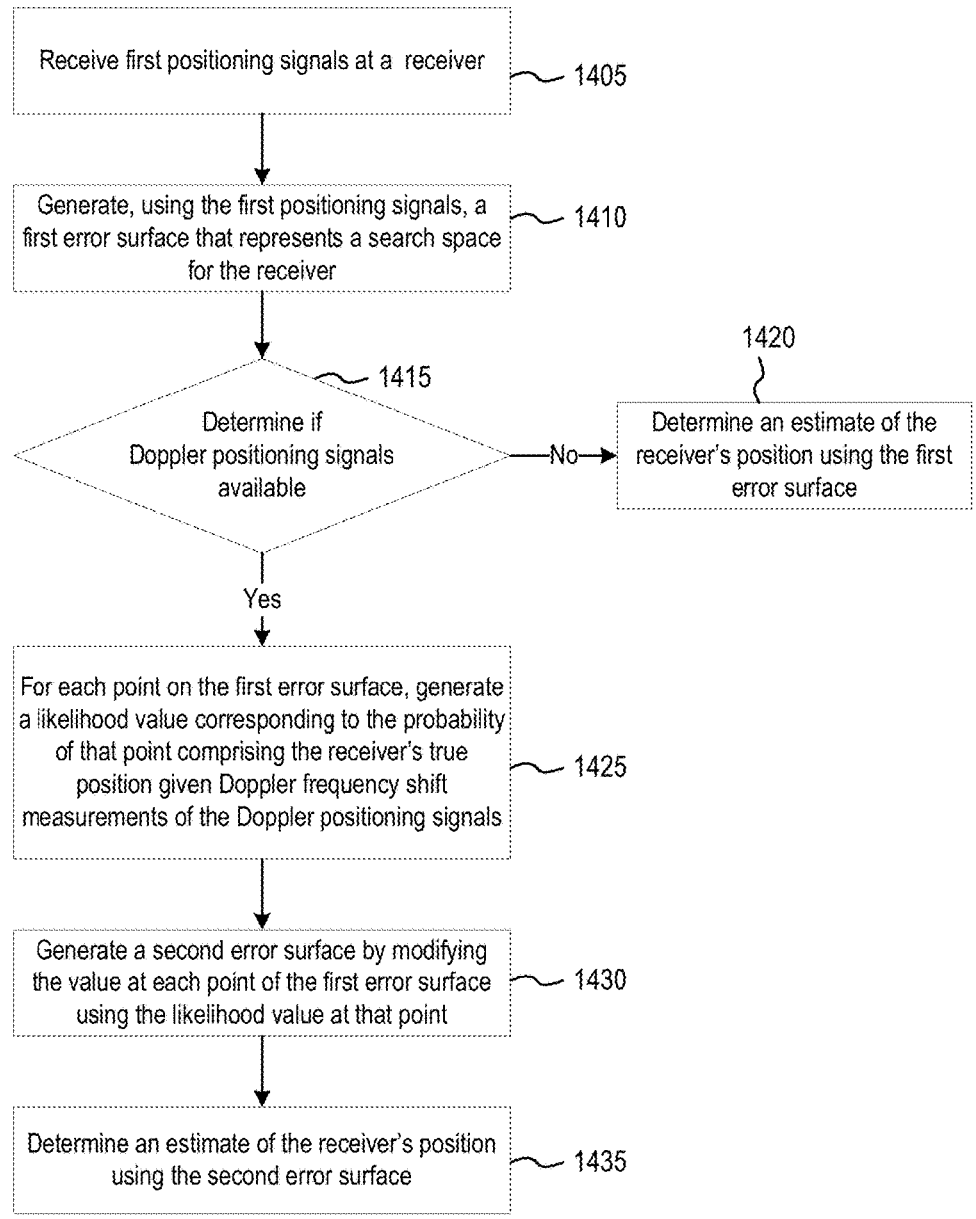
FIG. 14 includes a process for estimating the position of a receiver using Doppler frequency measurements of satellite signals to influence the error surface of a cost function.

A process for estimating the position of the receiver using Doppler frequency measurements of signals from one or more satellites to influence an error surface (e.g. error surface 1115) of a cost function is shown in FIG. 14. The process includes the steps of: receiving first positioning signals at a receiver (step 1405); generating a first error surface using the first positioning signals (step 1410); determining if Doppler positioning signals are available (step 1415); if it is determined that Doppler positioning signals are not available, determining an estimate of the receiver's position using the first error surface; if it is determined that Doppler positioning signals are available, for each point on the first error surface, generating a likelihood value corresponding to the probability of that point including the receiver's true position given Doppler frequency shift measurements corresponding to the Doppler positioning signals (step 1425); generating a second error surface by modifying the value at each point of the first error surface using the likelihood value at that point (step 1430); and determining an estimate of the receiver's position using the second error surface (step 1435).

By way of example, if J(x,y) is the cost function that corresponds to the value at each point (x,y) in the search space 1110, the second error surface 1315 may be generated using values of the first error surface 1115 and the output of Equation 5 as such:

$$\hat{J}(x,y) = J(x,y) * p(\hat{D}_{meas}|x,y)$$ (Equation 7), where $\hat{J}(x,y)$ is the value of the second error surface 1315 at each point (x,y) in the search space 1110 and $p(\hat{D}_{meas}|x,y)$ is the likelihood of that point (x,y) being the receiver's true position 1120 given Doppler frequency measurements determined using Doppler positioning signals like those from satellites 130 or 230.

In one embodiment, the estimated position of the receiver is determined by finding a region of minimum value on the second error surface and determining the estimated position of the receiver using the region of minimum value.

Figure 15:
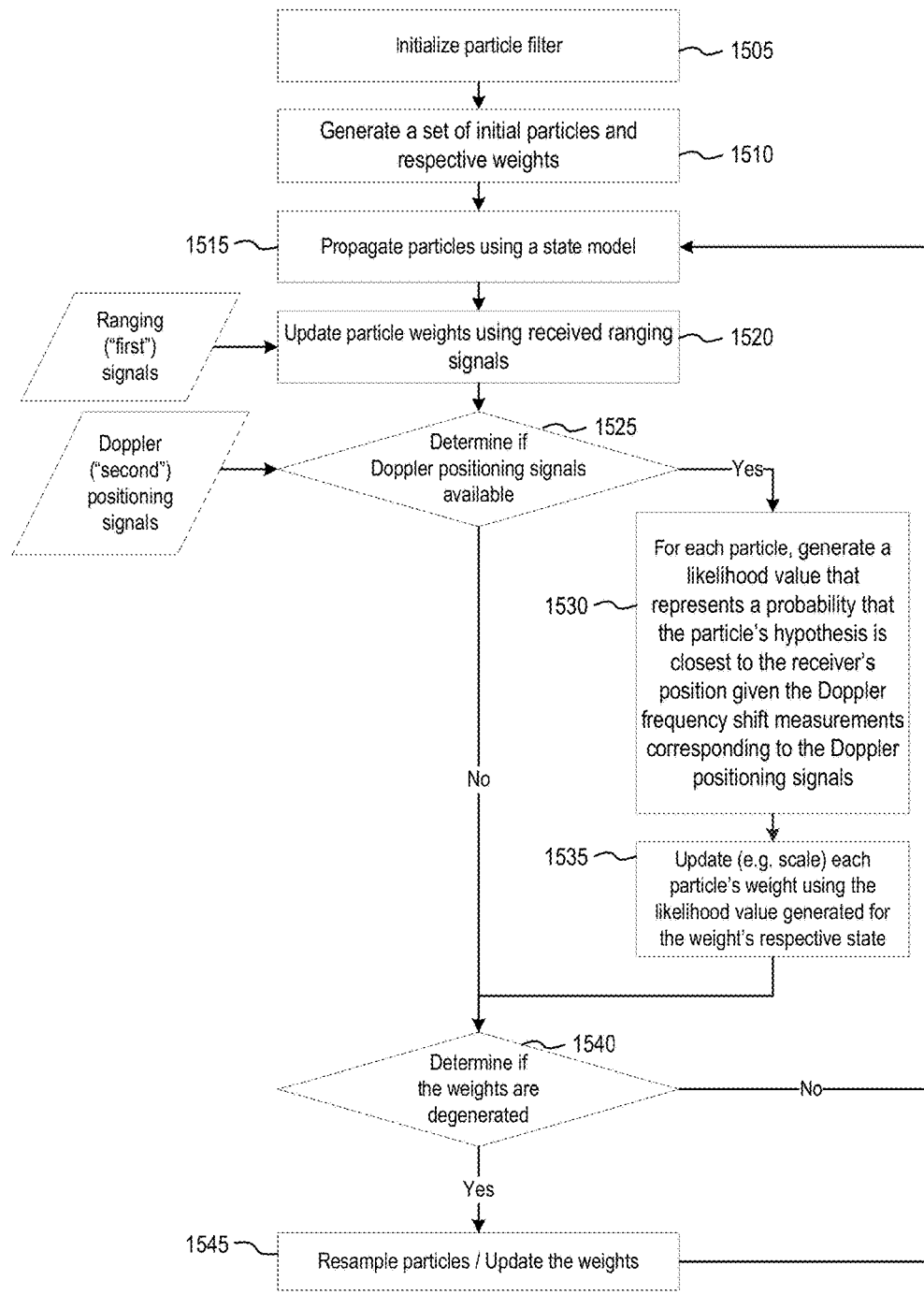
FIG. 15 includes a process for estimating the position of a receiver using Doppler frequency measurements of satellite signals to update particle weights of a particle filter.

A process for estimating the position of a receiver using Doppler frequency measurements of signals from a first satellite to update particle weights of an operative function like a particle filter is shown in FIG. 15. The process includes the steps of: initializing a particle filter (step 1505); generating a set of initial particles and respective weights, where each particle represents a hypothesis of the receiver's position in a search space, and each weight represents a probability that the respective particle's hypothesis is closest to the receiver's position (step 1510); propagating the particles using a state model (step 1515); updating particle weights using received ranging signals (step 1520); determining if Doppler positioning signals are available (step 1525); if Doppler positioning signals are available, for each particle, generating a likelihood value that represents a probability that the particle's hypothesis is closest to the receiver's position given the Doppler frequency shift measurements corresponding to the Doppler positioning signals (step 1530); updating (e.g. by scaling) each particle's weight using the "likelihood" value generated for the weight's respective state (step 1535); determining if the weights are degenerated (i.e. by determining that the number of weights having a negligible value surpass a predefined threshold amount, or by using other methods of determination as are known) (step 1540); if the particle weights are not degenerated, continuing to step 1515; and if the particle weights are degenerated, resampling the particles/updating each respective weight using the likelihood value generated for its respective particle (step 1545). Flow then continues back to step 1515.

During step 1520, particle weights are updated using new range measurements made using ranging signals from a terrestrial transmitter like the transmitters 110 from FIG. 6 and/or a second satellite like the satellites 650 from FIG. 6. As the new range measurements become available, the weight of each particle at hypothetical receiver position ($x_i$, $y_i$) may be updated using the following equation:

$$w_i^{k+1} = w_i^k * p(\text{range measurements}|(x_i, y_i)) \quad \text{(Equation 8)},$$

where $w_i^k$ is the prior weight of particle i corresponding to state time k, and $w_i^{k+1}$ is the updated weight of particle i generated by scaling the prior weight $w_i^k$ by the equation:

$$p(\text{range measurements}|(x_i, y_i)) \quad \text{(Equation 9)}.$$

Equation 9 corresponds to the probability of the hypothetical position ($x_i$, $y_i$) being the receiver's true location 1120 given the new range measurements made using the ranging signals.

In step 1525, if the Doppler positioning signals are available, Equation 5 may be used to further scale the particle's prior weight $w_i^k$ (steps 1530 and 1540) by the output of the likelihood function $p(x_i, y_i|\hat{D}_{meas})$, which corresponds to the probability of the hypothetical position ($x_i$, $y_i$) being the receiver's true location 1120 given the Doppler frequency measurements determined using the Doppler positioning signals, as seen below:

$$w_i^{k+1} = w_i^k * p(\text{range measurements}|(x_i, y_i)) * p(\hat{D}_{meas}|x_i, y_i) \quad \text{(Equation 10)}.$$

Figure 16:
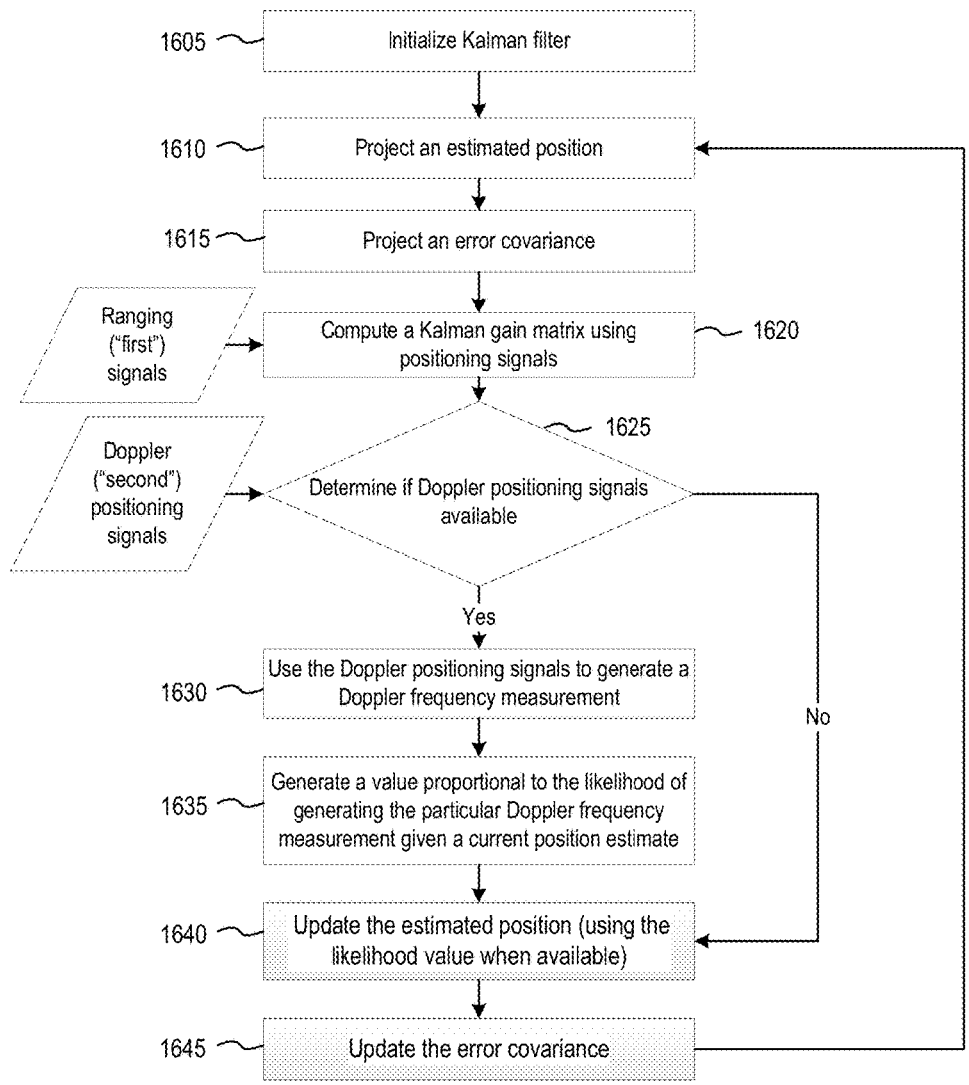
FIG. 16 includes a process for estimating the position of a receiver using Doppler frequency measurements of satellite signals to update state variables of a Kalman filter.

A process for estimating the position of a receiver using Doppler frequency measurements of Doppler positioning signals to update state variables of an operative function like a Kalman filter is shown in FIG. 16. The process includes the steps of: initializing a Kalman filter (step 1605); projecting an estimated position (step 1610); projecting an error covariance (step 1615); computing a Kalman gain matrix using ranging signals (step 1620); and determining if Doppler positioning signals are available (step 1625). If it is determined at step 1625 that Doppler positioning signals are not available, the process includes the steps of continuing flow to step 1640. If it is determined at step 1625 that Doppler positioning signals are available, the process includes the steps of: using the Doppler positioning signals to generate a Doppler frequency measurement, $\hat{D}_{meas}$ (step 1630); generating a value, $p(\hat{D}_{meas}|x_{KF}, y_{KF})$, proportional to the likelihood of generating the particular Doppler frequency measurement, $\hat{D}_{meas}$, given a current estimated position ($x_{KF}$, $y_{KF}$) (step 1635); updating the estimated position (e.g. using the likelihood value, $p(\hat{D}_{meas}|x_{KF}, y_{KF})$) (step 1640); and updating the error covariance (step 1645). The process flow then continues back to step 1610.

During step 1640, the estimated position is updated with or without using the likelihood value depending on if Doppler positioning signals are available. By taking the derivative of the right hand side of Equation 3 with respect to $\hat{r}_u$, the following equation is generated:

$$\Delta \hat{D} = \underline{V}_i^T \cdot \left( \frac{I}{\|r_i - \hat{r}_u\|} - \frac{(r_i - \hat{r}_u)(r_i - \hat{r}_u)^T}{\|r_i - \hat{r}_u\|^3} \right) \cdot \frac{L}{c} \cdot \Delta \hat{r}_u, \quad \text{(Equation 11)}$$

where I is a 3-by-3 identity matrix. Thereafter, the measurement vector $$\underline{V}_i^T \cdot \left( \frac{I}{\|r_i - \hat{r}_u\|} - \frac{(r_i - \hat{r}_u)(r_i - \hat{r}_u)^T}{\|r_i - \hat{r}_u\|^3} \right) \cdot \frac{L}{c} \quad \text{(Equation 12)}$$

can be used when updating the Kalman state (i.e. the estimated position) and the error covariance matrix, following classic Kalman filter correction equations.

Figure 17:
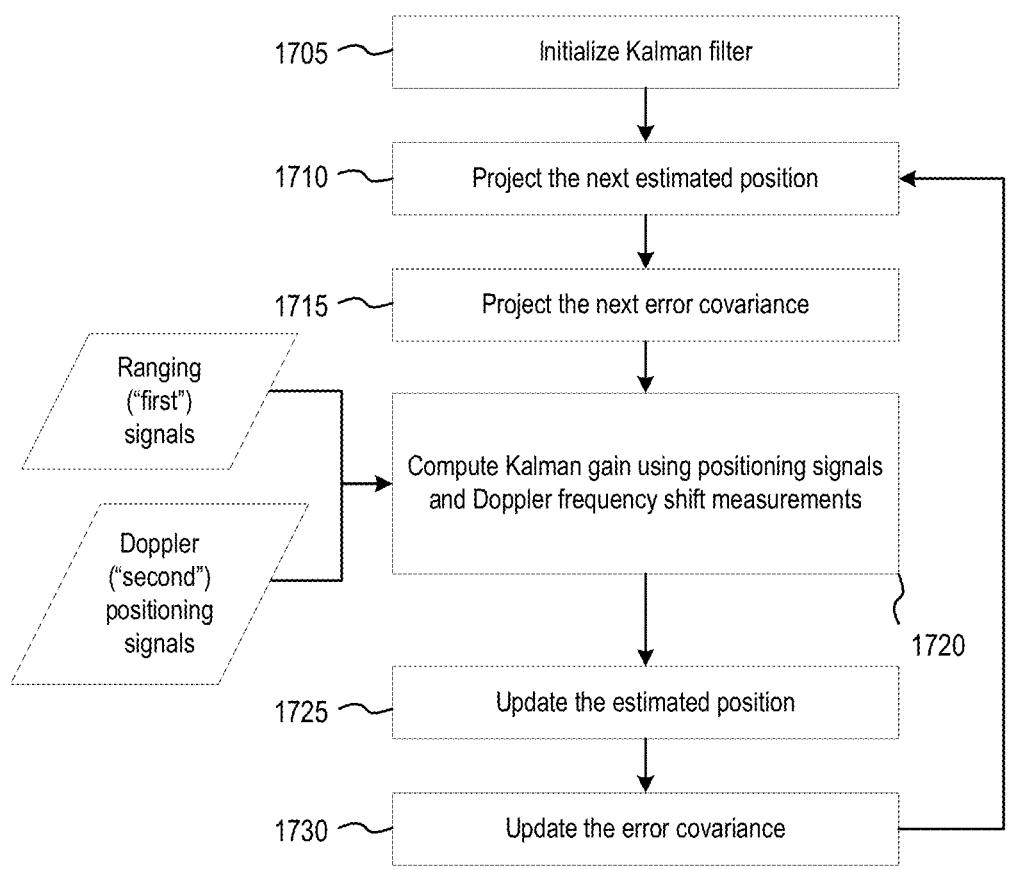
FIG. 17 includes a process for estimating the position of a receiver using Doppler frequency measurements of satellite signals as inputs to an Extended Kalman filter.

A process for estimating the position of the receiver using Doppler frequency measurements of Doppler positioning signals as inputs to an operative function like an Extended Kalman filter is shown in FIG. 17. The process includes the steps of: initializing a Kalman filter (step 1705); projecting the next estimated position (step 1710); projecting the next error covariance (step 1715); computing Kalman gain using ranging signals and Doppler frequency shift measurements (step 1720); updating the estimated position (step 1725); and updating the error covariance (step 1730). Flow then continues back to step 1710.

Instead of using a likelihood value as was described in FIG. 16, estimated positions of the receiver may be generated using "sensor fusion" of Doppler frequency measurements and positioning signals. Thus, ranging information generated using Doppler frequency shift measurements, as well as ranging information generated using ranging signals, are used as inputs to the Extended Kalman filter, which may implement a variety of sensor fusion techniques as known to one of skill in the art.

Other Aspects

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform or are operable to perform different method steps/stages disclosed herein are also contemplated, where the modules are implemented using one or more machines listed herein or other suitable hardware.

When two things (e.g. modules or other features) are "coupled to" each other, those two things may be directly connected together (e.g. shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g. data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e. not limited to) as opposed to an exclusive sense (i.e. consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g. a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g. satellites, other transmitters, receivers, a server); RF front end module(s) with circuitry components (e.g. analog/digital logic and power circuitry, tuning circuitry, buffer and power amplifiers, and other components as is known or otherwise disclosed herein); processing module(s) for performing signal processing (e.g. generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g. pressure, temperature, humidity, wind, or other conditions); and/or interface module(s) for exchanging information with other systems via other links other than a radio link. Signals transmitted by a transmitter may carry different information that, once determined by a receiver or a server, may identify the following: the transmitter that transmitted the signal; the location (LLA) of that transmitter; pressure, temperature, humidity, and other conditions at or near that transmitter; and/or other information.

A receiver may be in the form of a computing device (e.g. a mobile phone, tablet, laptop, digital camera, tracking tag). A receiver may also take the form of any component of the computing device, including a processor. By way of example, a receiver may include: antenna module(s) for exchanging signals with other systems (e.g. satellites, terrestrial transmitters, receivers); RF front end module(s) with circuitry components (e.g. mixers, filters, amplifiers, digital-to-analog and analog-to-digital converters as is known or otherwise disclosed herein); processing module(s) for signal processing of received signals to determine position information (e.g. times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g. pressure, temperature, humidity, wind), which may be compared to the same environmental conditions at or near transmitters to determine the altitude of the receiver; other sensor module(s) for measuring other conditions (e.g. acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g. Global Navigation Satellite Systems (GNSS) like GPS, GLONASS, Galileo, and Compass/Beidou), terrestrial systems, and hybrid satellite/terrestrial systems.

Related Applications

This application relates to the following related application(s): U.S. patent application Ser. No. 62/240,205, filed 12 Oct. 2015 (Inventors: Venkataraman; Meng). The content of each of the related application(s) is hereby incorporated by reference herein in its entirety.

The invention claimed is:
1. A method for estimating a position of a receiver, the method comprising:

receiving, at the receiver, first positioning signals from transmitters of a first network;

receiving, at the receiver, second signals from transmitters of a second network;

generating Doppler frequency shift measurements using the second signals; and determining an estimated position of the receiver using the first positioning signals and the Doppler frequency shift measurements by:

(i) initializing a Particle Filter;

(ii) generating a plurality of particles and respective weights, wherein each particle represents a hypothesis of the position of the receiver, and wherein each respective weight represents a probability that the hypothesis of the respective particle is closest to the position of the receiver;

(iii) updating each of the respective weights using the first positioning signals;

(iv) generating, for each of the plurality of particles, a likelihood value that represents a probability that the hypothesis of the particle is closest to the position of the receiver given the Doppler frequency shift measurements; and (v) updating each respective weight using the likelihood value generated for its respective particle.

2. The method of claim 1, wherein the transmitters of the first network are included in one or more of a Global Navigation Satellite System (GNSS), a terrestrial navigation system, a wireless cellular network, or a network of wireless access points, and wherein the transmitters of the second network include one or more orbiting satellite vehicles with an orbital height of less than 15,000 km.

3. The method of claim 1, wherein the transmitters of the first network are included in one or more of a Global Navigation Satellite System (GNSS), a terrestrial navigation system, a wireless cellular network, or a network of wireless access points, and wherein the transmitters of the second network include one or more non-orbiting aerial vehicles.

4. The method of claim 1, wherein the transmitters of the first network are included in one or more of a Global Navigation Satellite System (GNSS), a terrestrial navigation system, a wireless cellular network, or a network of wireless access points, and wherein the transmitters of the second network include one or more low earth orbit (LEO) satellites.

5. The method of claim 1, wherein the transmitters of the first network include Global Positioning System (GPS) satellites, and wherein the transmitters of the second network include one or more non-GPS satellites.

6. The method of claim 1, wherein the receiver receives the first positioning signals from the transmitters of the first network when the receiver is in a first region, the method further comprising:

receiving, at the receiver, third positioning signals from transmitters of a third network when the receiver is in a second region;

receiving, at the receiver, additional signals from the transmitters of the second network;

generating additional Doppler frequency shift measurements using the additional signals; and determining another estimated position of the receiver using the third positioning signals and the additional Doppler frequency shift measurements, wherein the transmitters of the second network include one or more orbiting satellite vehicles with an orbital height of less than 15,000 km, one or more low earth orbit (LEO) satellites, or one or more non-orbiting aerial vehicles, and wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

7. The method of claim 1, wherein the receiver receives the first positioning signals from the transmitters of the first network during a first time period, the method further comprising:

receiving, at the receiver, third positioning signals from transmitters of a third network during a second time period;

receiving, at the receiver, additional signals from the transmitters of the second network;

generating additional Doppler frequency shift measurements using the additional signals; and determining another estimated position of the receiver using the third positioning signals and the additional Doppler frequency shift measurements, wherein the transmitters of the second network include one or more orbiting satellite vehicles with an orbital height of less than 15,000 km, one or more low earth orbit (LEO) satellites, or one or more non-orbiting aerial vehicles, and wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

8. A method for estimating a position of a receiver, the method comprising:

receiving, at the receiver, first positioning signals from transmitters of a first network;

receiving, at the receiver, second signals from transmitters of a second network;

generating Doppler frequency shift measurements using the second signals; and determining an estimated position of the receiver using the first positioning signals and the Doppler frequency shift measurements by:

(i) generating, using the first positioning signals, a first error surface that represents a search space for the receiver;

(ii) generating, for each point on the first error surface, a likelihood value corresponding to the probability of that point comprising the true position of the receiver given the Doppler frequency shift measurements;

(iii) generating a second error surface by modifying the value at each point of the first error surface using the generated likelihood value for that point; and (iv) determining the estimated position of the receiver using the second error surface.

9. The method of claim 8, wherein the estimated position of the receiver is determined by finding a region of minimum value on the second error surface and determining the estimated position of the receiver using the region of minimum value.

10. The method of claim 8, wherein the second error surface is generated by multiplying the value at each point of the first error surface by the likelihood value for that point.

11. The method of claim 8, wherein the transmitters of the first network are included in one or more of a Global Navigation Satellite System (GNSS), a terrestrial navigation system, a wireless cellular network, or a network of wireless access points, and wherein the transmitters of the second network include one or more orbiting satellite vehicles with an orbital height of less than 15,000 km.

12. The method of claim 8, wherein the transmitters of the first network are included in one or more of a Global Navigation Satellite System (GNSS), a terrestrial navigation system, a wireless cellular network, or a network of wireless access points, and wherein the transmitters of the second network include one or more non-orbiting aerial vehicles.

13. The method of claim 8, wherein the transmitters of the first network are included in one or more of a Global Navigation Satellite System (GNSS), a terrestrial navigation system, a wireless cellular network, or a network of wireless access points, and wherein the transmitters of the second network include one or more low earth orbit (LEO) satellites.

14. The method of claim 8, wherein the transmitters of the first network include Global Positioning System (GPS) satellites, and wherein the transmitters of the second network include one or more non-GPS satellites.

15. The method of claim 8, wherein the receiver receives the first positioning signals from the transmitters of the first network when the receiver is in a first region, the method further comprising:
  receiving, at the receiver, third positioning signals from transmitters of a third network when the receiver is in a second region;
  receiving, at the receiver, additional signals from the transmitters of the second network;
  generating additional Doppler frequency shift measurements using the additional signals; and
  determining another estimated position of the receiver using the third positioning signals and the additional Doppler frequency shift measurements,
  wherein the transmitters of the second network include one or more orbiting satellite vehicles with an orbital height of less than 15,000 km, one or more low earth orbit (LEO) satellites, or one or more non-orbiting aerial vehicles, and
  wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

16. The method of claim 8, wherein the receiver receives the first positioning signals from the transmitters of the first network during a first time period, the method further comprising:
  receiving, at the receiver, third positioning signals from transmitters of a third network during a second time period;
  receiving, at the receiver, additional signals from the transmitters of the second network;
  generating additional Doppler frequency shift measurements using the additional signals; and
  determining another estimated position of the receiver using the third positioning signals and the additional Doppler frequency shift measurements,
  wherein the transmitters of the second network include one or more orbiting satellite vehicles with an orbital height of less than 15,000 km, one or more low earth orbit (LEO) satellites, or one or more non-orbiting aerial vehicles, and
  wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

17. One or more non-transitory machine-readable media embodying program instructions that, when executed by one or more machines, cause the one or more machines to perform a method for estimating a position of a receiver, the method comprising:
  receiving, at the receiver, first positioning signals from transmitters of a first network;
  receiving, at the receiver, second signals from transmitters of a second network;
  generating Doppler frequency shift measurements using the second signals; and
  determining an estimated position of the receiver using the first positioning signals and the Doppler frequency shift measurements by:
    (i) initializing a Particle Filter;
    (ii) generating a plurality of particles and respective weights, wherein each particle represents a hypothesis of the position of the receiver, and wherein each respective weight represents a probability that the hypothesis of the respective particle is closest to the position of the receiver;
    (iii) updating each of the respective weights using the first positioning signals;
    (iv) generating, for each of the plurality of particles, a likelihood value that represents a probability that the hypothesis of the particle is closest to the position of the receiver given the Doppler frequency shift measurements; and
    (v) updating each respective weight using the likelihood value generated for its respective particle.

18. The one or more non-transitory machine-readable media of claim 17, wherein the transmitters of the first network are included in one or more of a Global Navigation Satellite System (GNSS), a terrestrial navigation system, a wireless cellular network, or a network of wireless access points, and wherein the transmitters of the second network include one or more orbiting satellite vehicles with an orbital height of less than 15,000 km.

19. The one or more non-transitory machine-readable media of claim 17, wherein the transmitters of the first network are included in one or more of a Global Navigation Satellite System (GNSS), a terrestrial navigation system, a wireless cellular network, or a network of wireless access points, and wherein the transmitters of the second network include one or more non-orbiting aerial vehicles.

20. The one or more non-transitory machine-readable media of claim 17, wherein the transmitters of the first network are included in one or more of a Global Navigation Satellite System (GNSS), a terrestrial navigation system, a wireless cellular network, or a network of wireless access points, and wherein the transmitters of the second network include one or more low earth orbit (LEO) satellites.

21. The one or more non-transitory machine-readable media of claim 17, wherein the transmitters of the first network include Global Positioning System (GPS) satellites, and wherein the transmitters of the second network include one or more non-GPS satellites.

22. The one or more non-transitory machine-readable media of claim 17, wherein the receiver receives the first positioning signals from the transmitters of the first network when the receiver is in a first region, the method further comprising:
receiving, at the receiver, third positioning signals from transmitters of a third network when the receiver is in a second region;
receiving, at the receiver, additional signals from the transmitters of the second network;
generating additional Doppler frequency shift measurements using the additional signals; and
determining another estimated position of the receiver using the third positioning signals and the additional Doppler frequency shift measurements,
wherein the transmitters of the second network include one or more orbiting satellite vehicles with an orbital height of less than 15,000 km, one or more low earth orbit (LEO) satellites, or one or more non-orbiting aerial vehicles, and
wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

23. The one or more non-transitory machine-readable media of claim 17, wherein the receiver receives the first positioning signals from the transmitters of the first network during a first time period, the method further comprising:
receiving, at the receiver, third positioning signals from transmitters of a third network during a second time period;
receiving, at the receiver, additional signals from the transmitters of the second network;
generating additional Doppler frequency shift measurements using the additional signals; and
determining another estimated position of the receiver using the third positioning signals and the additional Doppler frequency shift measurements,
wherein the transmitters of the second network include one or more orbiting satellite vehicles with an orbital height of less than 15,000 km, one or more low earth orbit (LEO) satellites, or one or more non-orbiting aerial vehicles, and
wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

24. One or more non-transitory machine-readable media embodying program instructions that, when executed by one or more machines, cause the one or more machines to perform a method for estimating a position of a receiver, the method comprising:
receiving, at the receiver, first positioning signals from transmitters of a first network;
receiving, at the receiver, second signals from transmitters of a second network;
generating Doppler frequency shift measurements using the second signals; and
determining an estimated position of the receiver using the first positioning signals and the Doppler frequency shift measurements by:
(i) generating, using the first positioning signals, a first error surface that represents a search space for the receiver;
(ii) generating, for each point on the first error surface, a likelihood value corresponding to the probability of that point comprising the true position of the receiver given the Doppler frequency shift measurements;
(iii) generating a second error surface by modifying the value at each point of the first error surface using the generated likelihood value for that point; and
(iv) determining the estimated position of the receiver using the second error surface.

25. The one or more non-transitory machine-readable media of claim 24, wherein the estimated position of the receiver is determined by finding a region of minimum value on the second error surface and determining the estimated position of the receiver using the region of minimum value.

26. The one or more non-transitory machine-readable media of claim 24, wherein the second error surface is generated by multiplying the value at each point of the first error surface by the likelihood value for that point.

27. The one or more non-transitory machine-readable media of claim 24, wherein the transmitters of the first network are included in one or more of a Global Navigation Satellite System (GNSS), a terrestrial navigation system, a wireless cellular network, or a network of wireless access points, and wherein the transmitters of the second network include one or more orbiting satellite vehicles with an orbital height of less than 15,000 km.

28. The one or more non-transitory machine-readable media of claim 24, wherein the transmitters of the first network are included in one or more of a Global Navigation Satellite System (GNSS), a terrestrial navigation system, a wireless cellular network, or a network of wireless access points, and wherein the transmitters of the second network include one or more non-orbiting aerial vehicles.

29. The one or more non-transitory machine-readable media of claim 24, wherein the transmitters of the first network are included in one or more of a Global Navigation Satellite System (GNSS), a terrestrial navigation system, a wireless cellular network, or a network of wireless access points, and wherein the transmitters of the second network include one or more low earth orbit (LEO) satellites.

30. The one or more non-transitory machine-readable media of claim 24, wherein the transmitters of the first network include Global Positioning System (GPS) satellites, and wherein the transmitters of the second network include one or more non-GPS satellites.

31. The one or more non-transitory machine-readable media of claim 24, wherein the receiver receives the first positioning signals from the transmitters of the first network when the receiver is in a first region, the method further comprising:
receiving, at the receiver, third positioning signals from transmitters of a third network when the receiver is in a second region;
receiving, at the receiver, additional signals from the transmitters of the second network;
generating additional Doppler frequency shift measurements using the additional signals; and determining another estimated position of the receiver using the third positioning signals and the additional Doppler frequency shift measurements, wherein the transmitters of the second network include one or more orbiting satellite vehicles with an orbital height of less than 15,000 km, one or more low earth orbit (LEO) satellites, or one or more non-orbiting aerial vehicles, and wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

32. The one or more non-transitory machine-readable media of claim 24, wherein the receiver receives the first positioning signals from the transmitters of the first network during a first time period, the method further comprising:

receiving, at the receiver, third positioning signals from transmitters of a third network during a second time period;

receiving, at the receiver, additional signals from the transmitters of the second network;

generating additional Doppler frequency shift measurements using the additional signals; and determining another estimated position of the receiver using the third positioning signals and the additional Doppler frequency shift measurements, wherein the transmitters of the second network include one or more orbiting satellite vehicles with an orbital height of less than 15,000 km, one or more low earth orbit (LEO) satellites, or one or more non-orbiting aerial vehicles, and wherein (a) the first network is a terrestrial navigation system and the third network is a Global Navigation Satellite System (GNSS), (b) the first network is the terrestrial navigation system and the third network is a wireless cellular network, or (c) the first network is the wireless cellular network and the third network is the GNSS.

* * * * *